United States Patent
Moosmann et al.

(10) Patent No.: US 8,753,139 B2
(45) Date of Patent: Jun. 17, 2014

(54) DEVICE FOR FASTENING AND CONTACTING ACTUATORS

(75) Inventors: Markus Moosmann, Grunkraut (DE); Michael Linder, Kressbronn (DE); Mark Pelzl, Meckenbeuren (DE); Marc Ruhstorfer, Meckenbeuren (DE); Karlheinz Mayr, Bregenz (AT)

(73) Assignee: ZF Friedrichshafen AG, Friedrichshafen (DE)

( * ) Notice: Subject to any disclaimer, the term of this patent is extended or adjusted under 35 U.S.C. 154(b) by 202 days.

(21) Appl. No.: 13/501,936

(22) PCT Filed: Oct. 29, 2010

(86) PCT No.: PCT/EP2010/066423
§ 371 (c)(1),
(2), (4) Date: Apr. 13, 2012

(87) PCT Pub. No.: WO2011/057899
PCT Pub. Date: May 19, 2011

(65) Prior Publication Data
US 2012/0214330 A1    Aug. 23, 2012

(30) Foreign Application Priority Data
Nov. 11, 2009   (DE) .......................... 10 2009 046 618

(51) Int. Cl.
*H01R 13/627*    (2006.01)
(52) U.S. Cl.
USPC ........................................................ 439/350
(58) Field of Classification Search
USPC .......................................... 439/350, 352, 357
See application file for complete search history.

(56) References Cited

U.S. PATENT DOCUMENTS

| | | | |
|---|---|---|---|
| 4,844,036 A | 7/1989 | Bassler et al. | |
| 5,577,480 A | 11/1996 | Gmelin et al. | |
| 5,598,824 A | 2/1997 | Treusch et al. | |
| 5,611,372 A | 3/1997 | Bauer et al. | |
| 6,419,530 B1 | 7/2002 | Holdenried et al. | |

FOREIGN PATENT DOCUMENTS

| | | |
|---|---|---|
| DE | 37 30 571 A1 | 3/1989 |
| DE | 43 32 118 A1 | 3/1995 |
| DE | 43 44 584 A1 | 6/1995 |
| DE | 195 45 011 A1 | 4/1997 |
| DE | 198 20 901 A1 | 11/1999 |
| DE | 10 2005 046 152 A1 | 4/2007 |
| EP | 0 306 739 A2 | 3/1989 |

OTHER PUBLICATIONS

German Search Report issued in corresponding German Application No. 10 2009 046 618.5 mailed Mar. 27, 2014.

*Primary Examiner* — Xuong Chung Trans
(74) *Attorney, Agent, or Firm* — Davis&Bujold, PLLC; Michael J. Bujold

(57) ABSTRACT

A device for the mechanical fastening and electrical contact with at least one control element (2), having first electrical contacts (9a, 9b), within a housing (3). Mating second electrical contacts (11a, 11b) are arranged on a connecting element (4) which can also be plugged into the housing (3). During assembly, the at least one control element (2) and the connecting element (4) are both plugged into the housing (3) so that such plugging engagement achieves electrical connection between the first electrical contacts (9a, 9b) and the second electrical contacts (11a, 11b) and, at the same time, an interlocked fastening of the at least one control element (2) with the housing (3).

18 Claims, 6 Drawing Sheets

DEVICE FOR FASTENING AND CONTACTING ACTUATORS

This application is a National Stage completion of PCT/EP2010/066423 filed Oct. 29, 2010, which claims priority from German patent application serial no. 10 2009 046 618.5 filed Nov. 11, 2009.

FIELD OF THE INVENTION

The invention concerns a device for fastening and contacting actuators.

BACKGROUND OF THE INVENTION

Devices of this type are know in the art in particular for electro-hydraulic controls or hydraulic shifting units of automatic transmissions. The shifting unit comprises a plurality of actuators, also referred to as actors or control elements, which are arranged in a housing and are activated electrically.

From DE 43 44 584 A1 a device in the form of a shifting mechanism for a geared change-speed transmission is known, such that a circuit board with a number of electrically controlled magnetic valves is fixed on a control unit housing. The magnetic valves are on the one hand connected mechanically to the circuit board by screw bolts and pressure pads, and on the other hand connected by way of laterally arranged contacts to conducting paths arranged on the circuit board, which lead to a central plug. The assembly of the magnetic valves is relatively complicated, since mechanical fixing and electrical contacting take place independently of one another in different working steps.

From DE 37 30 571 A1 a device for holding and electrically contacting electro-magnetically actuated fuel injection valves is known. The known device comprises two components that can be locked onto one another, namely a basic body that holds the injection valve and a so-termed contact strip, which comprises electric conductors and contact elements for contacting the magnetic valves. When the two components are assembled, the contact strip is placed onto the basic body and mechanically connected to it by retaining arms, and at the same time the electric contact to the magnetic valves is formed.

SUMMARY OF THE INVENTION

The purpose of the present invention is to design a device of the type mentioned at the start in such manner that the control elements can be fastened mechanically to the housing and contacted electrically at the same time, i.e. in one working step. Thus, a further objective of the invention is that the device should be as simple and quick to assemble as possible, so as to reduce production costs.

According to the invention, the second electrical contacts are arranged on a connecting element which is plugged into the housing and thereby brings about both the electrical contacting of the control elements and their mechanical fixing to the housing. By virtue of the design of the contacting element according to the invention as a plug-in component and the corresponding arrangement of the electrical contacts, the entire device, comprising the housing, the control elements and the plug-in connecting element, can be assembled in a single working step, i.e. in very little time, whereby production costs are reduced.

In a preferred embodiment, the control element or the control elements have recesses, preferably an annular groove, in the area of which the first electric contacts, i.e. the contacts of the control element are arranged. This has the advantage that when the contacting element is plugged in, the electric connection is produced.

In a further preferred embodiment, the contacting element has at least two fingers or plug-in elements on which the second electric contacts are arranged. By virtue of the plug-in fingers, which engage with interlock in the recesses, on the one hand the connecting element is mechanically fastened to the housing and the control elements are both mechanically fastened and electrically contacted.

According to a further preferred embodiment, the housing has apertures and/or through-going perforations, whereby an interlocked connection between the connecting element and the housing is produced.

In another preferred embodiment the second electrical contacts fixed on the fingers are elastically springy, so that when the connecting element is plugged in they can slide under spring force over the first electrical contacts of the control element and at the same time produce the contact pressure required for an electrical connection.

According to a further preferred embodiment, the control element has a surrounding annular groove and the connecting element has a curved portion that fits into the annular groove between two adjacent fingers. In this way, when the connecting element is plugged in an interlock is established with the control element, which is therefore mechanically fixed.

In a further preferred embodiment, the housing has a plurality of receiving openings arranged in a row for holding the control elements. The connecting element has a corresponding number of fingers and second electrical contacts. This brings the advantage that any desired number of control elements can be mechanically fastened and electrically contacted at the same time.

According to another preferred embodiment, the connecting element, including its fingers, is in the form of a plastic injection-molded component, which at the same time holds the electrical conductors for supplying current to the second electrical contacts.

In a further preferred embodiment, the device comprises an electro-hydraulic control unit and is preferably in the form of a hydraulic shifting unit for an automatic transmission.

BRIEF DESCRIPTION OF THE DRAWINGS

An example embodiment of the invention is illustrated in the drawing and will be described in more detail below, such that from the description and/or the drawing, further features and/or advantages can emerge. The drawing shows.

DETAILED DESCRIPTION OF THE PREFERRED EMBODIMENTS

Figure 1:
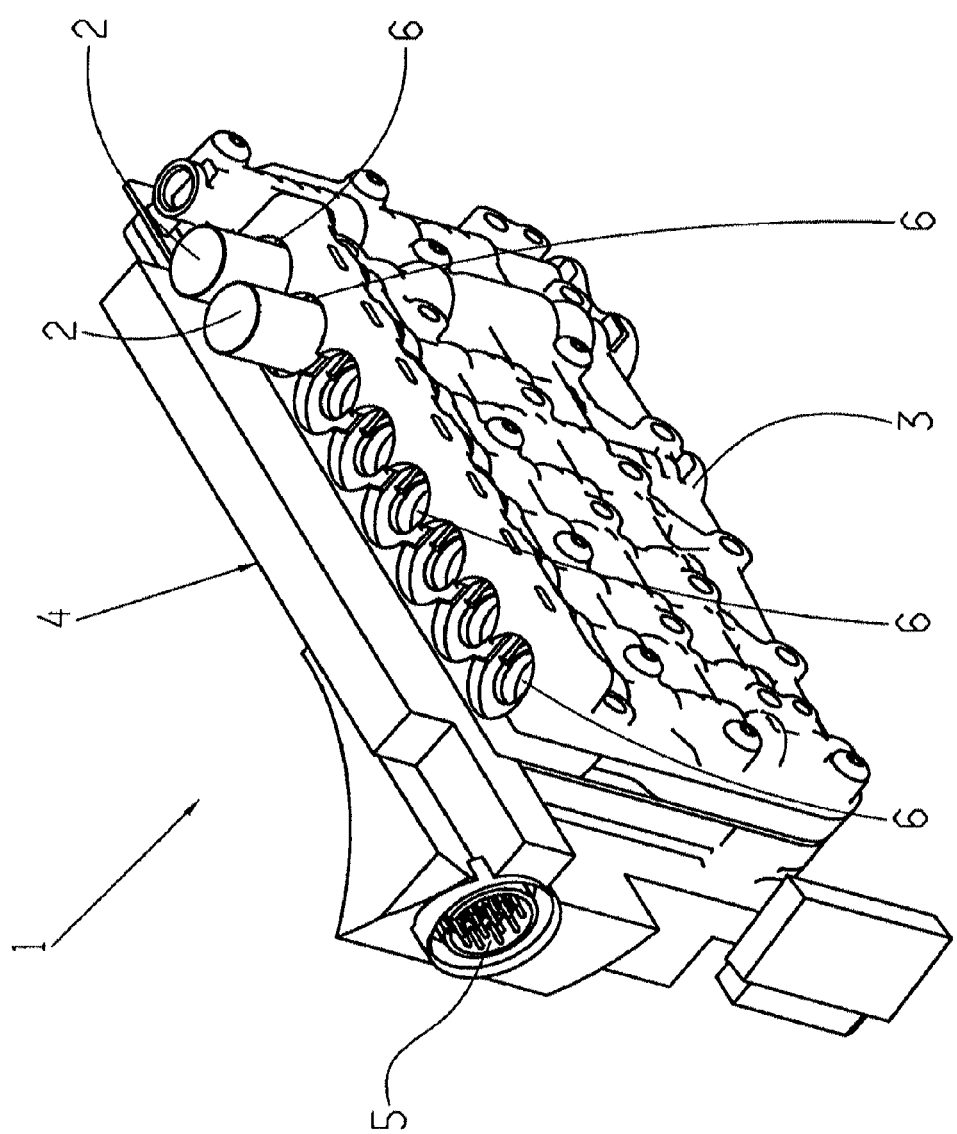
FIG. 1: An arrangement according to the invention, of control elements in a housing.

FIG. 1 shows a 3D representation of a device 1 according to the invention for the mechanical fastening and electrical contacting of control elements 2 in a housing 3. The housing 3 is connected by a plug connection to a connecting element 4, which comprises a central connecting plug 5. The device 1 according to the invention is preferably in the form of a hydraulic shifting unit of an automatic transmission for motor vehicles and thus serves inter alia for actuating shifting elements (clutches, brakes) of the automatic transmission. The housing 3 has a plurality of receiving openings 6, which are arranged next to one another in a row and which serve to hold control elements 2, only two of which are shown. The control elements 2, also referred to as actuators or actors, are preferably in the form of pressure regulators. Other control elements 2 (not shown) can be in the form of electromagnetic valves with various structures and characteristics. The control elements 2 are contacted electrically and actuated by way of the contacting element independently of one another. For this, electrical conductors (not shown) are disposed in the contacting element 4, which come together in the central connection plug. The connection plug 5 is connected to a control unit (not shown), preferably an electronic transmission control system. The device 1 is assembled by first inserting the control elements 2 into the receiving openings 6. Then the connecting element 4 is connected to the housing 3 by plugging it in, whereby at the same time the control elements 2 are mechanically fastened in the housing 3 and the control elements 2 are contacted electrically by the connecting element 4. This is described in greater detail below.

Figure 2:
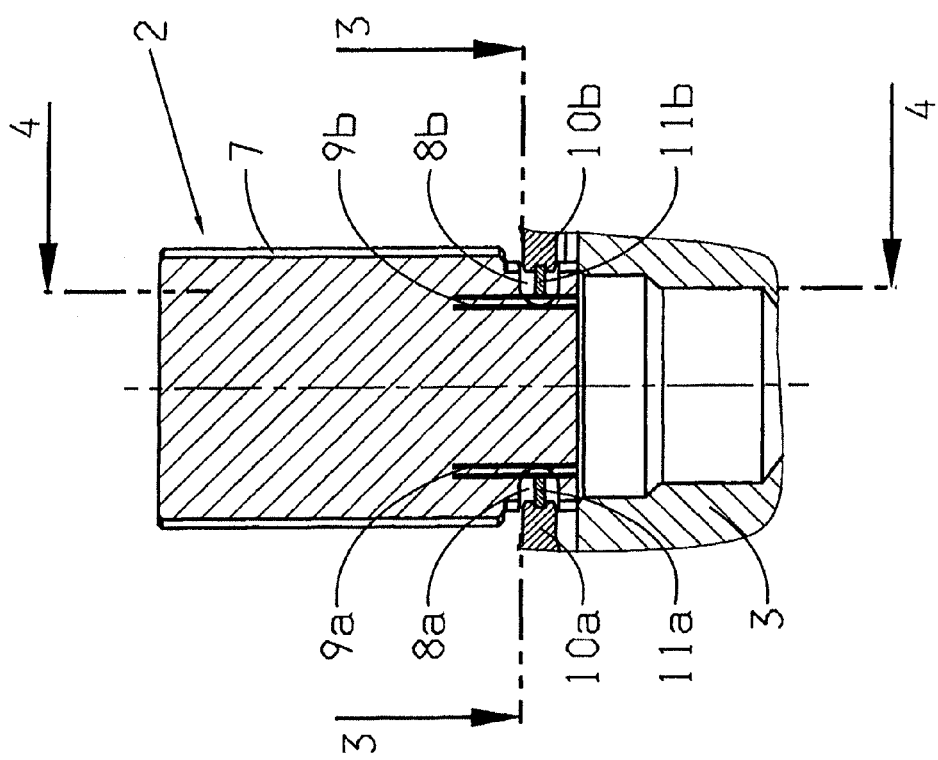
FIG. 2: A longitudinal section in the plane 2-2 in FIG. 3, through a control element, a connecting element and a housing.

FIG. 2 is an enlarged section showing the arrangement of a control element 2 in the housing 3. The same indexes as in FIG. 1 are used for the same components. The section shown in FIG. 2 is taken in the plane 2-2 indicated in FIG. 3. The control element 2 has a cylindrical housing 7 in which, in the area within the housing 3, lateral recesses 8a, 8b are provided which form an at least partially surrounding annular groove in the cylindrical housing 7. The control element 2 has first electrical contacts 9a, 9b, which are arranged on the one hand within the cylindrical housing 7 and on the other hand project outward in the area of the recesses 8a, 8b, so that they have free ends. In the recesses 8a, 8b, fingers 10a, 10b of the connecting element 4 engage with interlock (see FIGS. 2 and 3). On the inner side of the fingers 10a, 10b, i.e., on the side facing toward the control element 2, are provided second electrical contacts 11a, 11b which are inserted with elastic springiness in corresponding slits of the fingers 10a, 10b and which make contact with the first electrical contacts 9a, 9b. By virtue of the springiness of the second electrical contacts 11a, 11b the necessary contact pressure is ensured.

Figure 3:
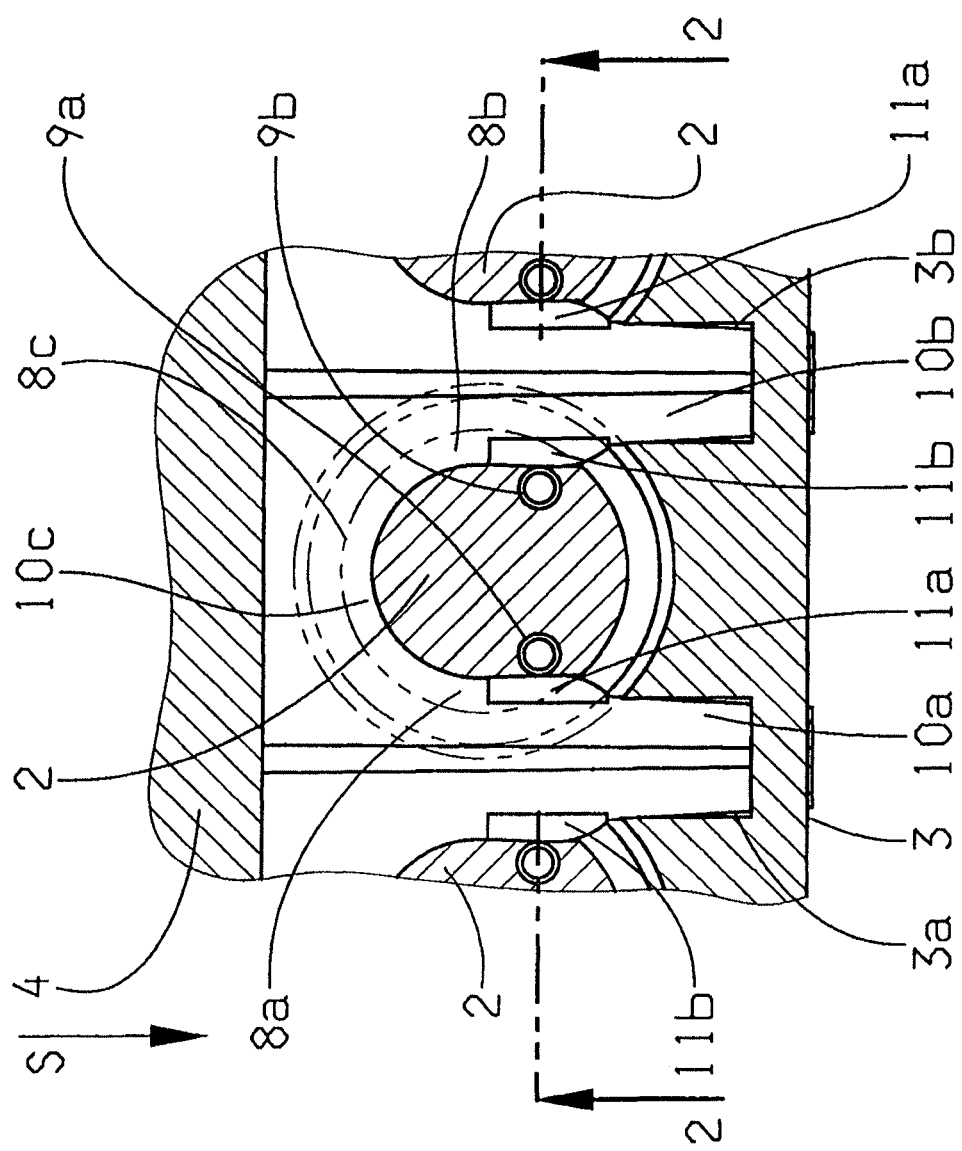
FIG. 3: A cross-section in the plane 3-3 in FIG. 2, FIG. 4: A longitudinal section through the control element, the connecting element and the housing, in the plane 4-4 in FIG. 2, FIG. 5: The connecting element with fingers and electrical contacts, shown in 2D.

FIG. 3 shows a section in the plane 3-3 indicated in FIG. 2, i.e. a cross-section through the control element 2 viewed in the direction toward the fingers 10a, 10b that are part of the connecting element 4. The fingers 10a and 10b are parallel to one another and are connected to one another by a U-shaped area or curved portion 10c, engaging in each case between neighboring control elements 2 and having on each side second electrical contacts 11a, 11b. The recesses 8a, 8b form a surrounding annular groove 8c (partially indicated by dot-dash lines), in which the curved portion 10c engages with interlock. The housing 3 has recesses 3a, 3b in which the front ends of the fingers 10a and 10b engage with interlock.

The assembly of the connecting element 4, the control elements 2 and the housing 3 takes place by a plugging movement in a direction indicated by an arrow S. First, the control elements 2 are inserted into the housing 3 and fixed. Then the connecting element 4 with its fingers 10a, 10b is plugged into the housing 3 in the direction of the arrow S, so that the ends of the fingers 10a, 10b are held in the recesses 3a, 3b. During the plug-in movement in the direction of the arrow S, the sprung second electrical contacts 11a, 11b slide along the first electrical contacts 9a, 9b until the contacting element 4 encounters an end-stop. During the plug-in movement the curve 10c slips into the annular groove 8c and so forms an interlocked connection between the connecting element 4 and the control element 2, whereby the latter is fastened mechanically. At the same time the contact is formed between the first electrical contacts 9a, 9b and the second electrical contacts 11a, 11b, the latter being connected to conductors inside the connecting element 4.

Figure 4:
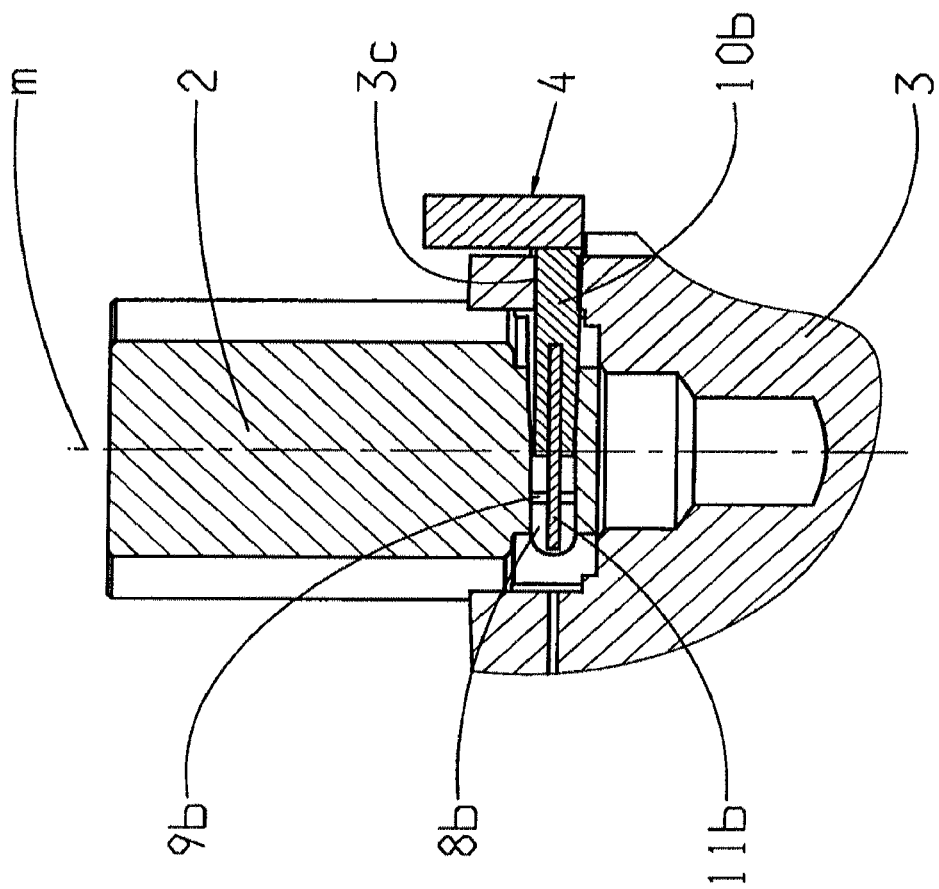

FIG. 4 shows a section in the plane 4-4 indicated in FIG. 2. The first electrical contact 9b is arranged in the area of the recess 8b and is contacted by the second electrical contact 11b arranged on the finger 10b. The housing 3 has a through-going perforation 3c through which the finger 10b projects and is therefore fixed relative to the housing 3. From the representation in FIG. 4 it can also be seen that the finger 10b is in contact with the annular groove on both sides, i.e. above and below on the flanks of the recess 8b. Thus, in the direction of its longitudinal axis m the control element 2 is fixed in relation to the housing 3.

Figure 5:
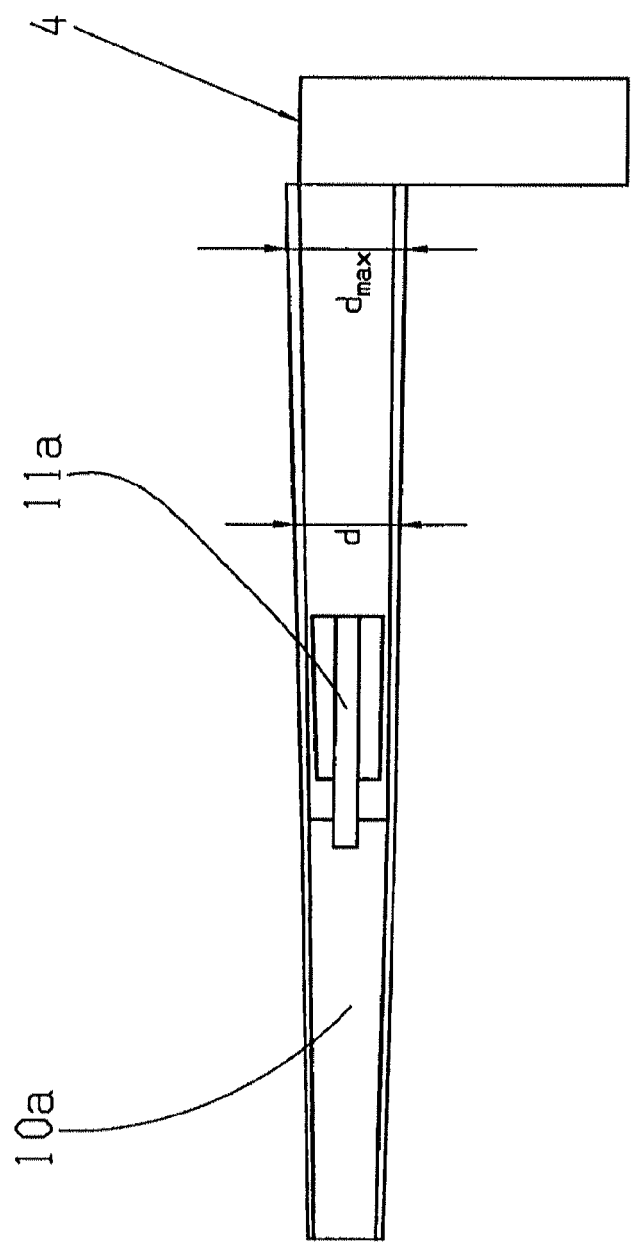

FIG. 5 shows the connecting element 4 with the finger 10a as an enlarged, detailed 2D representation. The thickness d of the finger 10a decreases, i.e. the finger tapers in the direction toward its free end and the maximum thickness $d_{max}$ occurs in the area of its connection to the connecting piece 4. By virtue of this conical shape a wedge effect acts on engagement in the recesses 8a, 8b and play-free, clamping attachment is produced, which at the same time prevents release of the connection. The contact 11a—as also the other second electrical contacts—is connected to electrical conductors (not shown) that pass through the connecting element 4. The latter can advantageously be in the form of an injection-molded plastic component. In that case the conductors are embedded.

Figure 6:
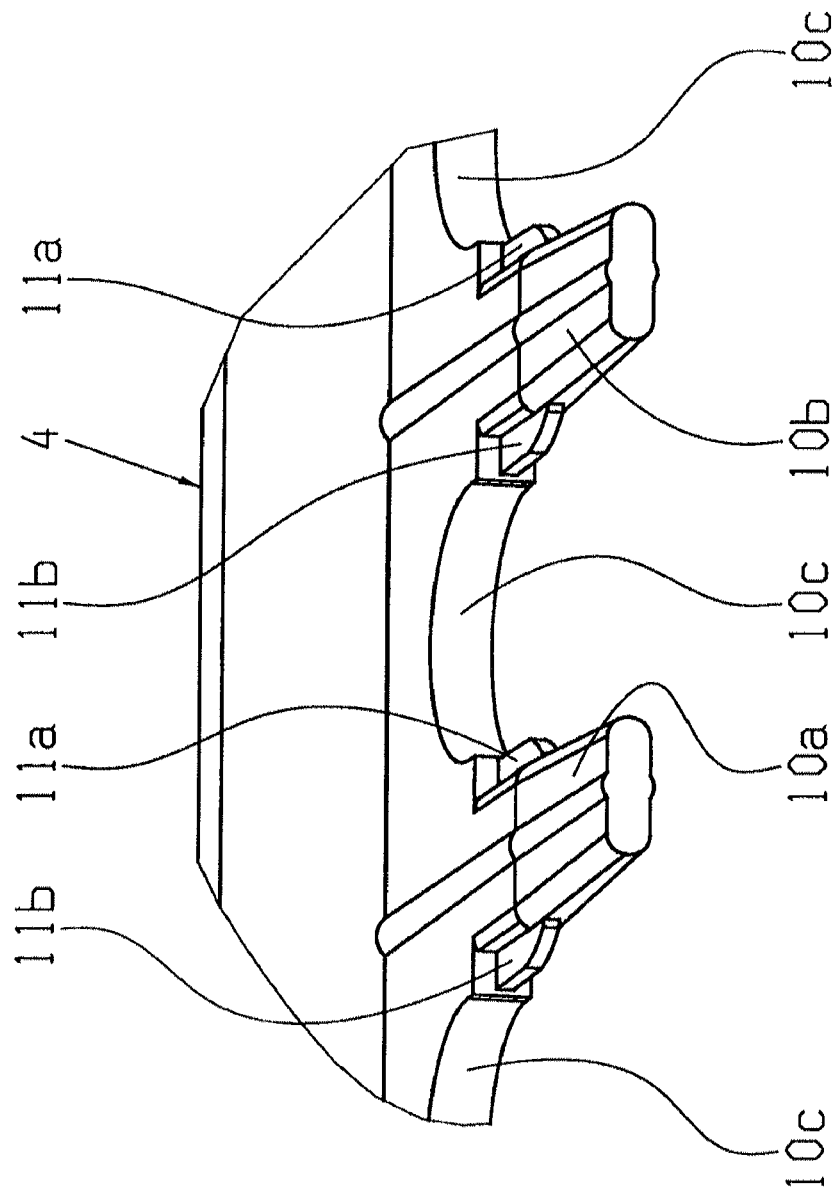
FIG. 6: 3D representation of the connecting element, with fingers for fastening and electrical contacts.

FIG. 6 shows a 3D representation of a section of the connecting element 4 with two fingers 10a, 10b, each having on both sides second electrical contacts 11a, 11b. Between the fingers 10a, 10b extends the curve 10c. As already partially shown in FIG. 3, a finger 10a, 10b engages in each case between two neighboring control elements and thus forms an electrical contact on each side. Accordingly, the connecting element 4 can be designed for any desired number of control elements.

INDEXES

1 Device
2 Control element
3 Housing
3a Recess
3b Recess
4 Connecting element
5 Connection plug
6 Receiving opening
7 Cylindrical housing
8a Recess
8b Recess
8c Annular groove
9a First electrical contact
9b First electrical contact
10a Finger
10b Finger
10c Curved portion
11a Second electrical contact
11b Second electrical contact
S Plug-in direction
d Thickness $d_{max}$ Maximum thickness
m Longitudinal axis

The invention claimed is:

1. A device for mechanical fastening and electrical contacting of, within a housing (3), at least one control element (2) comprising a pair of first electrical contacts (9a, 9b) with second electrical contacts (11a, 11b) being associatable with the first electrical contacts (9a, 9b),
the at least one control element (2) defining a central longitudinal axis,
each one of the pair of first electrical contacts (9a, 9b) defining a contact axis which extends parallel to the longitudinal axis of the at least one control element (2), and each one of the pair of first electrical contacts (9a, 9b) being spaced from one another and spaced from the longitudinal axis of the control element (2),
the second electrical contacts (11a, 11b) being arranged on a contacting element (4) which plugs into the housing (3) such that the plugging engagement of the contacting element (4) with the housing (3) achieves electrical contact between the first electrical contacts (9a, 9b) and the second electrical contacts (11a, 11b) and, at the same time, an interlocked fastening connection with the at least one control element (2) is achieved.

2. The device according to claim 1, wherein the control element (2) has recesses (8a, 8b) about its periphery, and the pair of the first electrical contacts (9a, 9b) are arranged in an area of the recesses (8a, 8b).

3. The device according to claim 2, wherein the contacting element (4) has at least two fingers (10a, 10b) each of which carries at least one of the second electrical contacts (11a, 11b), and the at least two fingers interlockingly engaging with the recesses (8a, 8b) and so as to form the contact between the first and the second electrical contacts (9a, 9b; 11a, 11b).

4. The device according to claim 3, wherein the housing (3) has recesses (3a, 3b) in which leading ends of the at least two fingers (10a, 10b) are plugged.

5. The device according to claim 3, wherein the pair of the first electrical contacts (9a, 9b) are arranged about a periphery of the at least one control element (2) and the second electrical contacts (11a, 11b) are arranged on sides of the at least two fingers (10a, 10b) that face inwardly toward the periphery of the at least one control element (2).

6. The device according to claim 5, wherein the second electrical contacts (11a, 11b) are arranged on the at least two fingers (10a, 10b) in an elastically springy manner.

7. The device according to claim 2, wherein the recesses (8a, 8b) form an annular groove (8c) which extends at least over half of a circumference of the control element (2), and the connecting element (4) has a curved portion (10c), formed between the at least two fingers (10a, 10b), which interlockingly engages with the annular groove (8c).

8. The device according to claim 1, wherein the at least one control element (2) comprises a plurality of control elements (2) which are arranged in the housing (3) adjacent one another in a row, and the plurality of control elements (2) have intermediate spaces therebetween, and the connecting element (4) has a plurality of fingers (10a, 10b) which plug into the intermediate spaces for securing the plurality of control elements (2) to the housing (3).

9. The device according to claim 8, wherein the second electrical contacts (11a, 11b) are connected to electrical conductors in the connecting element (4).

10. The device according to claim 9, wherein the electrical conductors engage one another via a central connection plug (5).

11. The device according to claim 9, wherein the connecting element (4) is an injection-molded plastic component which contains the electrical conductors therein.

12. The device according to claim 1, wherein the housing (3) comprises an electro-hydraulic control unit for an automatic transmission and is a hydraulic shifting unit.

13. The device according to claim 1, wherein some of the control elements are pressure regulators (2a).

14. The device according to claim 1, wherein a first one of the pair of first electrical contacts is disposed along a circumferential side of the control element (2) while a second one of the pair of first electrical contacts is disposed along an opposite circumferential side of the control element (2).

15. The device according to claim 1, wherein the contacting element (4) has first and second fingers (10a, 10b), and the first and the second fingers are spaced apart from one another and extend parallel to and are coplanar with one another.

16. The device according to claim 1, wherein the at least one control element (2) comprises at least adjacent first and second control elements (2), the contacting element (4) has a first pair of the second electrical contacts (11a, 11b) for engaging with the first control element (2) and a second pair of the second electrical contacts (11a, 11b) for engaging with the second control element (2), and one finger of each of the first and the second pairs of second electrical contacts (11a, 11b) are located between the adjacent first and second control elements (2).

17. A device for mechanically securing and electrically connecting at least one control element (2) within a housing (3),
the control element (2) having recesses (8a, 8b) and a pair of first electrical contacts (9a, 9b) being located within the recesses (8a, 8b), and the control element (2) defining a central longitudinal axis,
a connecting element (4) having at least first and second fingers (10a, 10b) with one second electrical contact (11a) mounted on the first finger (10a) and engaging with a first of the pair of first electrical contacts (9a), and another second electrical contact (11b) mounted on the second finger (10b) and engaging with a second of the pair of first electrical contacts (9b),
the control element (2) being engagable within the housing (3) such that the first and the second fingers (10a, 10b) of the connecting element (4) engage with the recesses (8a, 8b) of the control element (2), and the first and the second fingers extending substantially normal to the longitudinal axis of the control element, and
the at least one control element (2) being simultaneously mechanically secured and electrically connected by an interlocking engagement with the connecting element (4).

18. A device for mechanically securing and electrically connecting at least one control element (2) within a housing (3),
the control element (2) having at least one recess (8a, 8b) in which pair of first electrical contacts (9a, 9b) being located, and the control element (2) defining a central longitudinal axis,
a connecting element (4) having a pair of fingers (10a, 10b) supporting second electrical contacts (11a, 11b) located for engagement with the pair of first electrical contacts (9a, 9b) of the at least one control element (2),
the control element (2) being engagable within the housing (3) and subsequently the connecting element (4) being engagable within the housing (3) such that the pair of fingers (10a, 10b) of the connecting element (4) project through a through-going perforation (3c) in the housing (3) and lockingly engage with the recesses (8a, 8b) of the control element (2), and leading ends of the fingers (10a, 10b) lockingly engage with respective recesses (3a, 3b) in the housing (3), and the at least one control element (2) being simultaneously mechanically secured and electrically connected by an interlocking engagement with the connecting element (4).

* * * * *